United States Patent
Sato

(10) Patent No.: US 6,411,870 B1
(45) Date of Patent: Jun. 25, 2002

(54) DERAILMENT DETECTING METHOD AND DERAILMENT DETECTING APPARATUS FOR ROLLING STOCK

(75) Inventor: Kunihito Sato, Yokohama (JP)

(73) Assignee: Tokyu Car Corporation, Kanagawa (JP)

(*) Notice: Subject to any disclaimer, the term of this patent is extended or adjusted under 35 U.S.C. 154(b) by 0 days.

(21) Appl. No.: 09/717,175

(22) Filed: Nov. 20, 2000

Related U.S. Application Data

(63) Continuation-in-part of application No. PCT/JP98/03552, filed on Aug. 10, 1998.

(51) Int. Cl.[7] .............................. B60L 1/00; E01B 27/00
(52) U.S. Cl. ............................. 701/19; 701/10; 701/34; 701/43; 73/121; 73/129; 33/287
(58) Field of Search ............................... 701/19, 20, 31, 701/34, 43; 73/129, 121, 128; 104/7.2, 2, 7.1, 10, 12; 33/287; 246/415 A

(56) References Cited

U.S. PATENT DOCUMENTS

| 6,023,966 A | * | 2/2000 | Mazur et al. ................. 73/129 |
| 6,123,298 A | * | 9/2000 | Riley ..................... 246/415 A |
| 6,260,485 B1 | * | 7/2001 | Theurer et al. .............. 104/7.2 |

FOREIGN PATENT DOCUMENTS

| JP | 7-79501 | 3/1995 |
| JP | 9-39790 | 2/1997 |
| JP | 10-278795 | 10/1998 |

OTHER PUBLICATIONS

Patent Abstracts of Japan, Publication No. 07079501 A, dated Mar. 20, 1995, one page.
Patent Abstracts of Japan, Publication No. 10278795, dated Oct. 20, 1998, 2 pages.
Patent Abstracts of Japan, Publication No. 09039790, dated Feb. 10, 1997, 2 pages.

* cited by examiner

Primary Examiner—William A. Cuchlinski, Jr.
Assistant Examiner—Tuan C To
(74) Attorney, Agent, or Firm—Rosenthal & Osha L.L.P.

(57) ABSTRACT

During traveling of rolling stock on a route, running velocity of the rolling stock is detected. Vertical acceleration is also detected at a carbody above spring rigging of truck and a component is extracted in a predetermined frequency range from the vertical acceleration. When an absolute value of the vertical acceleration in the frequency range exceeds preset limit vertical acceleration corresponding to running velocity, the rolling stock is judged as being derailed. In another embodiment double integral of the vertical acceleration is carried out every predetermined evaluating time to calculate a vertical displacement amount. In the case that the vertical displacement amount is negative and an absolute value thereof is not less than a predetermined reference value, it is then determined that the rolling-stock is derailed.

9 Claims, 8 Drawing Sheets

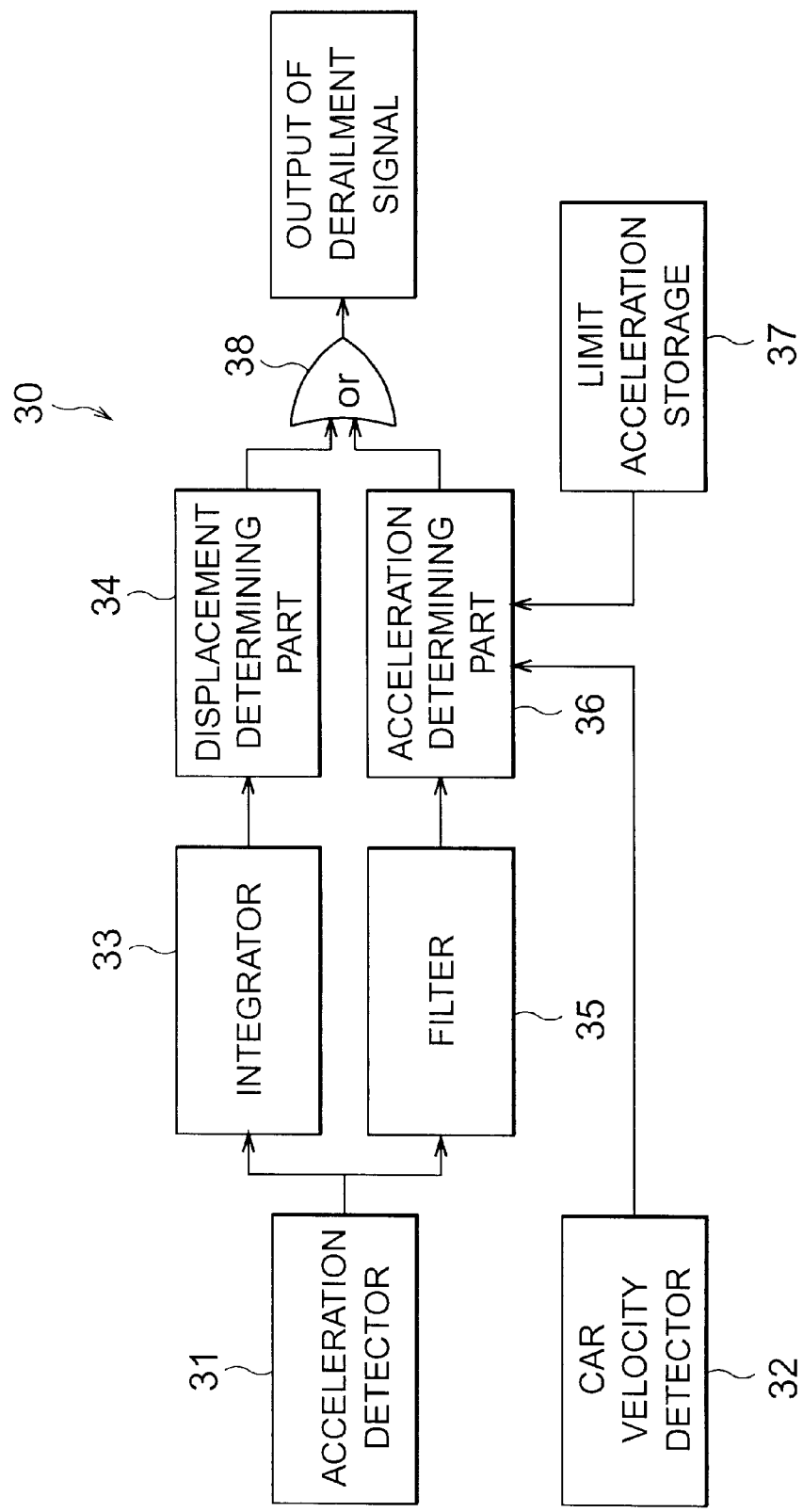

DERAILMENT DETECTING METHOD AND DERAILMENT DETECTING APPARATUS FOR ROLLING STOCK

RELATED APPLICATIONS

This is a Continuation-In-Part application of International Patent Application Ser. No. PCT/JP98/03552 filed on Aug. 10, 1998, now pending.

BACKGROUND OF THE INVENTION

1. Field of the Invention

The present invention relates to a derailment detecting method and derailment detecting apparatus for automatically detecting derailment of rolling stock.

2. Related Background Art

In general, in the event of derailment of rolling stock, the derailment must be detected by the motorman etc. of the rolling stock, by visual recognition or personal sensation of the motorman etc. However, in the case that the derailment should occur at a car coupled in the rear, even during manned operation, there would be possibilities that the motorman etc. could fail to recognize the derailment. For automatic unmanned operation of rolling stock, it is necessary to prevent the derailed rolling stock from keeping running and stop the rolling stock immediately upon occurrence of the derailment.

An object of the present invention is, therefore, to provide a derailment detecting method and derailment detecting apparatus for rolling stock capable of automatically detecting the derailment of rolling stock.

SUMMARY OF THE INVENTION

A derailment detecting method for rolling stock according to the present invention is applied to the rolling stock comprises a truck having wheels rolling on rails and spring rigging, and a carbody to which the truck is attached. In this derailment detecting method, the rolling stock is preliminarily made to travel at varying running velocities on a predetermined route. On that occasion, a maximum of vertical acceleration at the carbody above the spring rigging is measured in a predetermined frequency range and at each of the varying running velocities. Then, from each maximum of vertical acceleration, a limit vertical acceleration is defined as a threshold for detecting the derailment at each running velocity. During actual traveling of the rolling stock on the route, real running velocity of the rolling stock is detected. During the actual traveling, real vertical acceleration is also detected at the carbody above the spring rigging. A component in the above-stated frequency range is extracted from the real vertical acceleration detected. In the case that an absolute value of the real vertical acceleration in the frequency range exceeds the limit vertical acceleration corresponding to the real running velocity detected, it is then determined that the rolling stock is derailed.

As described above, the limit vertical acceleration is defined to be in correspondence to each real running velocity of the rolling stock. Then, during the actual traveling of the rolling stock, the vertical acceleration at the carbody etc. is compared with the limit vertical acceleration corresponding to the real running velocity. As a result, the derailment can be detected accurately and surely.

In this case, it is preferable to set the limit vertical acceleration to a value larger than the maximum of the vertical acceleration previously measured.

It is also preferable to determine that the rolling stock is derailed, in the case that there occur a predetermined number of such events that the absolute value of the real vertical acceleration exceeds the critical vertical acceleration corresponding to the real running velocity within a predetermined time period. As a result, it is possible to avoid an accident of erroneously detecting the derailment because of enormous vertical acceleration exceptionally appearing during normal traveling.

Further, it is preferable that the aforementioned frequency range be a frequency range in which an absolute value of permissible vertical acceleration for assuring riding comfort is set at a minimum. Since in such a frequency range the difference becomes definite between vertical acceleration during normal traveling and vertical acceleration at derailment, the derailment can be detected accurately and surely.

Another derailment detecting method for rolling stock according to the present invention is applied to the rolling stock comprises a truck having wheels rolling on rails and spring rigging, and a carbody to which the truck is attached. In this derailment detecting method, the vertical acceleration is detected at the carbody above the spring rigging during running of the rolling stock on the rails. Then a vertical displacement amount is calculated by double integral of the vertical acceleration every predetermined evaluating time. This yields an amount of vertical displacement per evaluating time of the part above the spring rigging. In the event of the derailment of the rolling stock, the part above the spring rigging would descend over a predetermined amount. It is thus determined that the rolling stock is derailed, in the case that the vertical displacement amount is negative and an absolute value thereof is not less than a predetermined reference value. Employed as the evaluating time is a time period between a start of descent of the carbody and arrival at half the height of the rails, in a free fall of one axle of the wheels by a distance equal to the height of the rails. As a result, it is possible to surely discriminate between steady-state vertical displacement amounts of the carbody etc. during the normal traveling and vertical displacement amounts of the carbody etc. in the event of the derailment, both in flat territory and in gradient territory.

In this case, it is preferable on the occasion of the calculation of the vertical displacement amount to execute the double integral with the initial velocity of zero. This can cancel out the steady-state vertical displacement amounts of the carbody etc. under high-speed running in the gradient territory, whereby the derailment can be detected accurately and surely.

It is also preferable that the reference value for the comparison with the vertical displacement amount resulting from the double integral of the vertical acceleration be set to a value larger than a maximum change amount in the vertical direction of the spring rigging. In general, the height of rails is greater than the maximum change amount in the vertical direction of the spring rigging during the normal traveling of rolling stock. Therefore, at the event of the derailment of tolling stock, the carbody etc. would descend by an amount exceeding the maximum change amount in the vertical direction of the spring rigging during the normal traveling. Therefore, the derailment can be detected accurately and surely by setting the reference value for the comparison with the vertical displacement amount as described above.

A derailment detecting apparatus for rolling stock according to the present invention is applied to the rolling stock comprises a truck having wheels rolling on rails and spring rigging, and a carbody to which the truck is attached. This derailment detecting apparatus comprises a limit acceleration storage, a car velocity detector, an acceleration storage, a filter, and a determining part. The limit acceleration storage stores limit vertical acceleration as a threshold for detecting derailment. The limit vertical acceleration is defined for each running velocity from a maximum of vertical acceleration in a predetermined frequency range. Each running velocity is detected at the carbody above the spring rigging, at each of varying running velocities during traveling of the rolling stock at the varying running velocities on a predetermined route. The car velocity detector detects the real running velocity of the rolling stock traveling on the route. The acceleration detector detects the real vertical acceleration at the carbody above the spring rigging during traveling of the rolling stock on the route. The filter extracts a component in the above frequency range from the real vertical acceleration. Then the determining part determines that the rolling stock is derailed, in the case that an absolute value of the real vertical acceleration in the mentioned frequency range exceeds the limit vertical acceleration corresponding to the real running velocity.

Another derailment detecting apparatus of rolling stock according to the present invention is applied to the rolling stock comprises a truck having wheels rolling on rails and spring rigging, and a carbody to which the truck is attached. This derailment detecting apparatus comprises an acceleration detector, an integrator, and a determining part. The acceleration detector detects the vertical acceleration at the carbody above the spring rigging during running of the rolling stock on the rails. The integrator calculates a vertical displacement amount by double integral of the vertical acceleration every evaluating time. The evaluating time is a time period between a start of descent of the carbody and arrival at half the height of the rails, in a free fall of one axle of the wheels by a distance equal to the height of the rails. Then the determining part determines that the rolling stock is derailed, in the case that the vertical displacement amount is negative and an absolute value thereof is not less than a predetermined reference value.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 9 is a control block diagram of the derailment detecting apparatus for rolling stock according to the third embodiment of the present invention.

DESCRIPTION OF THE PREFERRED EMBODIMENTS

The preferred embodiments of the derailment detecting method and derailment detecting apparatus for rolling stock according to the present invention will be described hereinafter in detail with reference to the drawings.

Figure 1:
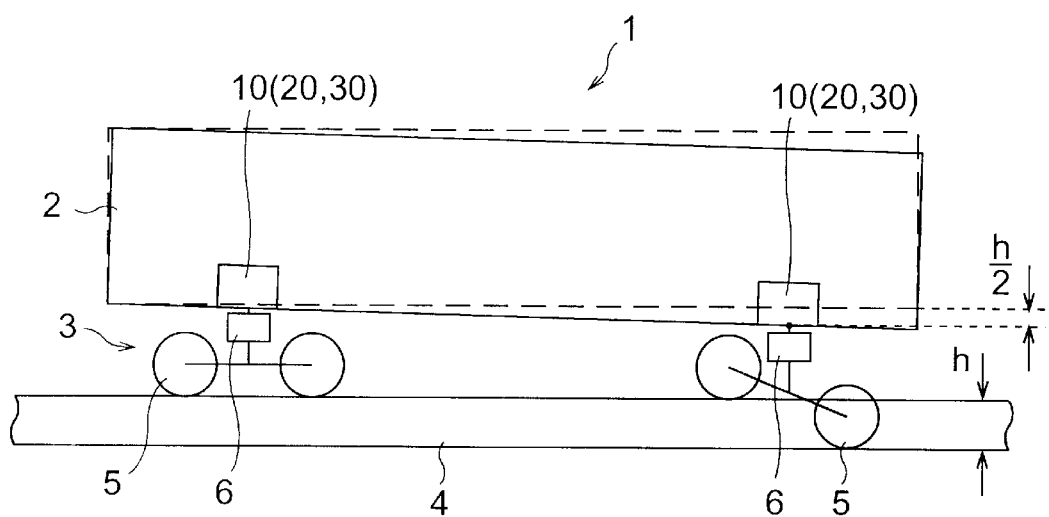
FIG. 1 is a schematic and structural diagram showing the rolling stock to which the derailment detecting apparatus according to the present invention is applied.

FIG. 1 is a schematic and structural diagram showing the rolling stock to which the derailment detecting apparatus for rolling stock according to the present invention is applied. The rolling stock 1 shown in FIG. 1 is driven by manned operation or by unmanned operation. The rolling stock 1 comprises a carbody 2 and two trucks 3 attached to the carbody 2. Each truck 3 incorporates wheels 5 rolling on rails 4, and spring rigging 6 such as an air spring or the like. The spring rigging 6 expands and contracts in the vertical direction during traveling of the rolling stock 1 to relieve vibration appearing at the part above the spring rigging 6 (the part including the carbody 2). The derailment detecting apparatus 10 according to the first embodiment of the present invention is mounted on the carbody 2 for accommodating passengers so as to be located substantially right above each truck 3. In this way, two derailment detecting apparatus 10 are mounted on one rolling stock 1.

Figure 2:
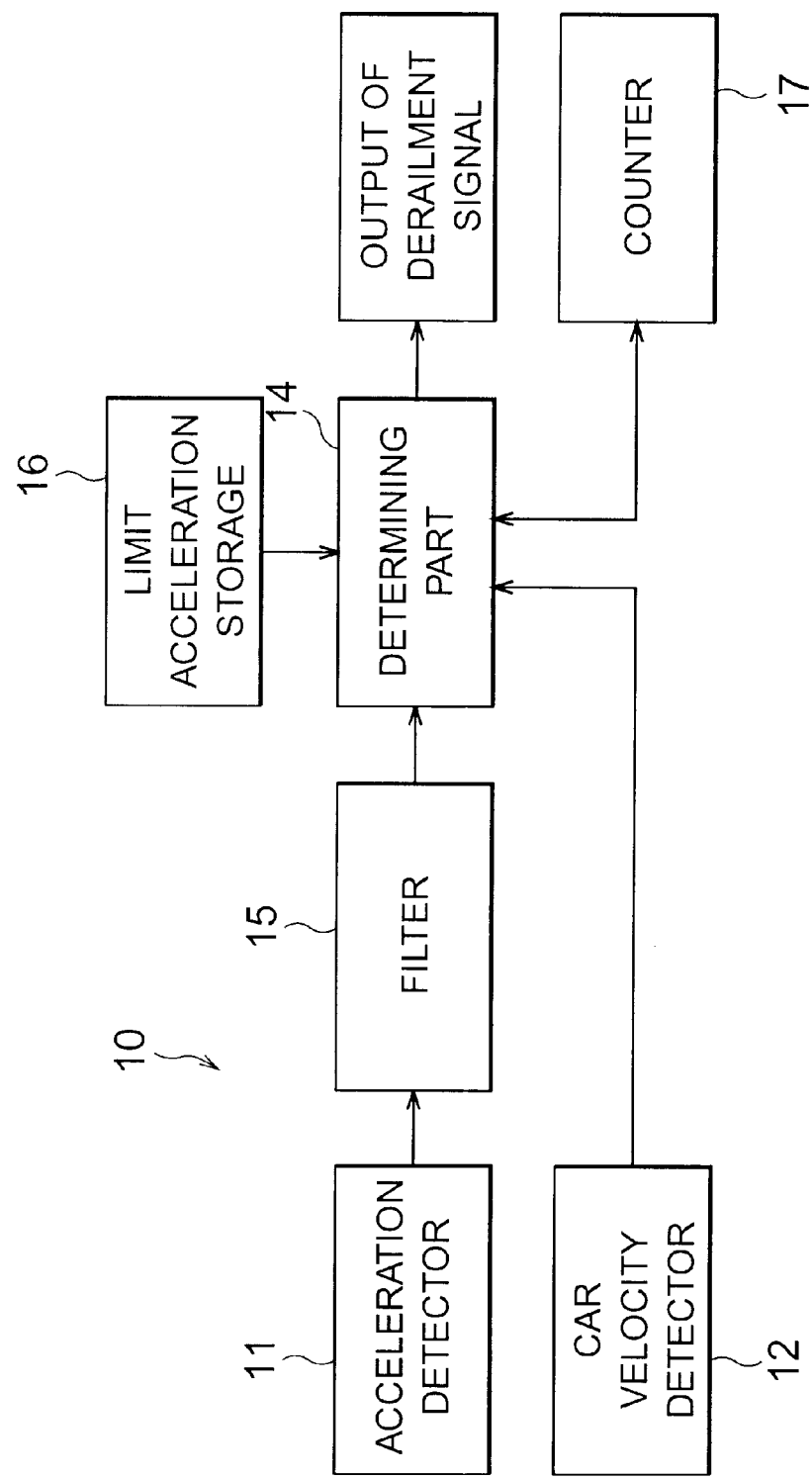
FIG. 2 is a control block diagram of the derailment detecting apparatus for rolling stock according to the first embodiment of the present invention.

FIG. 2 is a control block diagram of the derailment detecting apparatus 10. As showing in FIG. 2, the derailment detecting apparatus 10 includes an acceleration detector 11 and a car velocity detector 12. The acceleration detector 11 is attached to the carbody 2 and detects a vertical component (a) of acceleration appearing at the carbody 2 above the spring rigging 6 of the truck 3 during traveling of the rolling stock 1. The vertical component will be referred to hereinafter as "vertical acceleration (a)". The car velocity detector 12 detects the running velocity (v) during the traveling of the rolling stock 1. The car velocity detector 12 outputs a signal indicating the detected running velocity (v) of the rolling stock 1, to a determining part 14.

On the other hand, the acceleration detector 11 is connected to a filter 15 such as a band-pass filter or the like. This filter 15 extracts a component in a predetermined frequency range from the output of the acceleration detector 11. In this case, the predetermined frequency range is the range of 6 to 20 Hz. It is also possible to set as the range of 4 to 8 Hz. The following is the reason why the component in the predetermined frequency range ( 6to 20 Hz) is extracted herein from the vertical acceleration (a) detected by the acceleration detector 11.

Figure 3:
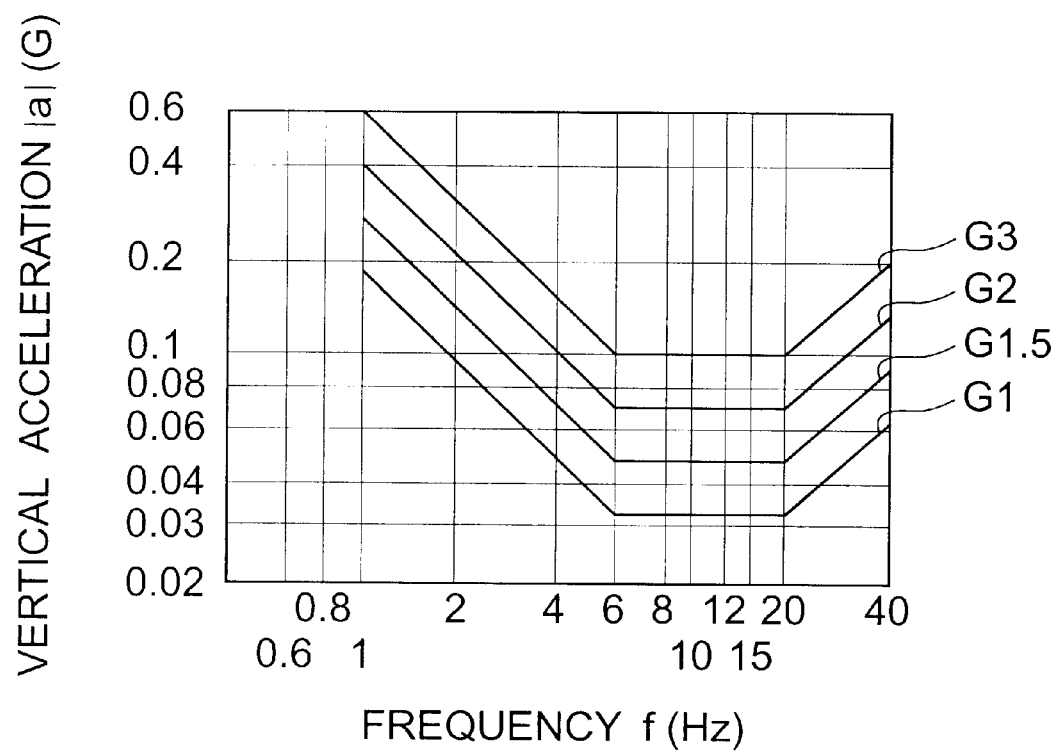
FIG. 3 is a graph showing the relationship between frequency and absolute values of vertical acceleration at the carbody of rolling stock.

Namely, the general rolling stock is designed and manufactured so that the relation between frequency f and absolute values of the vertical acceleration (a) at the carbody satisfies, for example, the characteristics illustrated in FIG. 3, in order to keep the riding comfort thereof good. FIG. 3 is a graph showing the relation between frequency f and absolute values of the vertical acceleration (a) at the carbody. In the graph of FIG.3, characteristic lines are illustrated at respective grades G1, G1.5, G2, G3 of riding comfort. In this case, the acceleration below the characteristic line corresponding to each grade G1 to G3 is judged as being within a permissible range. The acceleration above the characteristic line corresponding to each grade G1 to G3 is judged as being off the permissible range.

Since at each grade the vertical acceleration in the frequency range of 6 to 20 Hz can be the cause of deteriorating the riding comfort, the absolute value of tolerance of vertical acceleration (permissible vertical acceleration) is set to be flat and smaller in this frequency range than in the other frequency ranges. That is, the difference becomes definite between the vertical acceleration during normal traveling and the vertical acceleration at derailment in the frequency range of 6 to 20 Hz. As a result, the derailment can be detected accurately and surely.

The signal indicating the vertical acceleration (a) in the frequency range of 6 to 20 Hz extracted by the filter 15 is sent to the determining part 14. A limit acceleration storage 16 is connected to the determining part 14 and the limit acceleration storage 16 stores data indicating limit vertical acceleration (al) defined at each predetermined velocity as a threshold for detection of derailment.

The determining part 14 receives the signal indicating the vertical acceleration (a) from the acceleration detector 11 via the filter 15. The determining part 14 also receives the signal indicating the running velocity (v) from the car velocity detector 12. In accordance with the signal from the filter 15 and the signal from the car velocity detector 12, the determining part 14 determines whether the absolute value of the vertical acceleration (a) in the frequency range of 6 to 20 Hz is over the limit vertical acceleration (al) corresponding to the running velocity (v) detected by the car velocity detector 12.

The determining part 14 is connected to an operation unit of the rolling stock 1 or an automatic train stop device or the like, which is not shown. The determining part 14 outputs a derailment signal indicating the derailment of rolling stock 1, to the operation unit or the like when the absolute value of the vertical acceleration (a) becomes over the limit vertical acceleration (al). With output of the derailment signal, for example, power running of the rolling stock 1 is terminated and emergency brakes are actuated to stop the rolling stock 1 immediately. It is also possible to provide the operation unit with a derailment alarm lamp and to make the derailment alarm lamp blink when the derailment signal is outputted.

Preferably, a counter 17 is connected to the determining part 14, as shown in FIG. 2. When the absolute value of the vertical acceleration (a) exceeds the limit vertical acceleration (al) corresponding to the running velocity (v), the determining part 14 send signal to the counter 17. The counter 17 counts the number of such events that the absolute value of the vertical acceleration (a) exceeds the limit vertical acceleration (al) corresponding to the running velocity (v) within a predetermined time period. In this case, the rolling stock 1 is judged as being derailed when counts of the counter 17 exceed predetermined number within a predetermined time period. That is, the rolling stock 1 is judged as being derailed when there occur a predetermined number of such events that the absolute value of the vertical acceleration (a) exceeds the limit vertical acceleration (al) corresponding to the running velocity (v), within a predetermined time period. In such an apparatus, it is also possible to avoid the accident of erroneous detection of derailment due to the enormous vertical acceleration (a) exceptionally appearing during the normal traveling.

Figure 4:
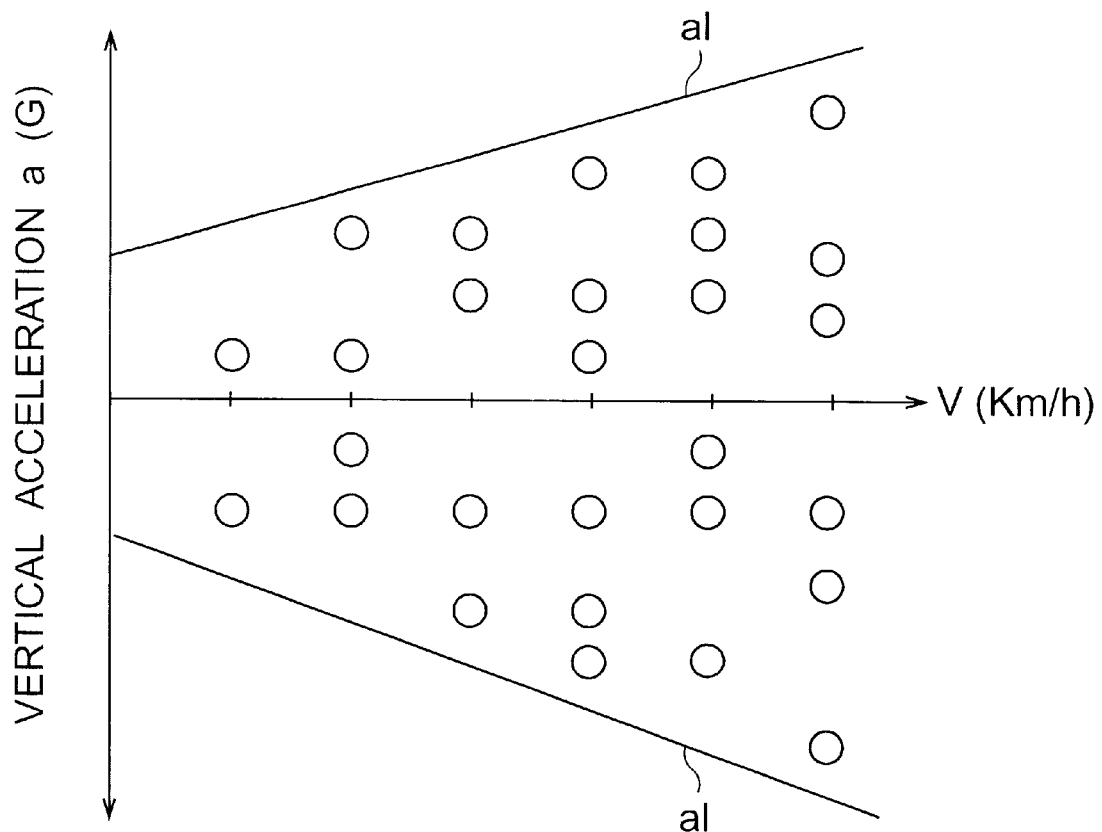
FIG. 4 is a graph for illustrating a defining procedure of limit vertical acceleration.

In application of the derailment detecting method according to the first embodiment of the present invention, the rolling stock 1 is preliminarily made to travel at varying running velocities (v) on a predetermined route (use line). At each of the varying running velocities (v) the vertical acceleration (a) appearing at the carbody 2 above the spring rigging 6 is measured in the frequency range (frequency range of 6 to 20 Hz). Then the limit vertical acceleration (al) is determined from the vertical acceleration (a) in the frequency range of 6 to 20 Hz. The limit vertical acceleration (al) can be determined by plotting maximums of the vertical acceleration (a) corresponding to the respective running velocities (v), preliminarily measured. Then, straight lines are defined so as to pass through values greater than the maximums and sets values on each straight line as the limit vertical acceleration (al), as shown in FIG. 4. The limit vertical acceleration (al) thus obtained is stored in the limit acceleration storage 16.

During actual traveling of the rolling stock 1 on the route (i.e., during business operation), the running velocity (v) (real running velocity) of the rolling stock 1 is detected and the vertical acceleration (a) (real vertical acceleration) is detected at the carbody 2 above the spring rigging 6. The filter 15 extracts the component in the frequency range of 6 to 20 Hz from the vertical acceleration (a) detected. When the absolute value of the vertical acceleration (a) in the above frequency range exceeds the limit vertical acceleration (al) corresponding to the running velocity (v) detected, the determining part 14 determines that the rolling stock 1 is derailed.

As described above, the limit vertical acceleration (al) is defined to be in correspondence to each real running velocity (v) of the rolling stock 1. Then, during the actual traveling of the rolling stock 1, the vertical acceleration (a) at the carbody 2 etc. is compared with each limit vertical acceleration (al) corresponding to the real running velocity (v). As a result, the derailment can be detected accurately and surely.

The embodiment was described in the structure in which the limit vertical acceleration (al) was set so as to vary corresponding to the running velocity, but the invention is not limited to this. Namely, the limit vertical acceleration (al) may also be set to be constant. In this case, the determining part 14 can be configured so as to output the derailment signal when the absolute value of the vertical acceleration (a) received from the filter 15 becomes, for example, over 0.2 G.

Figure 5:
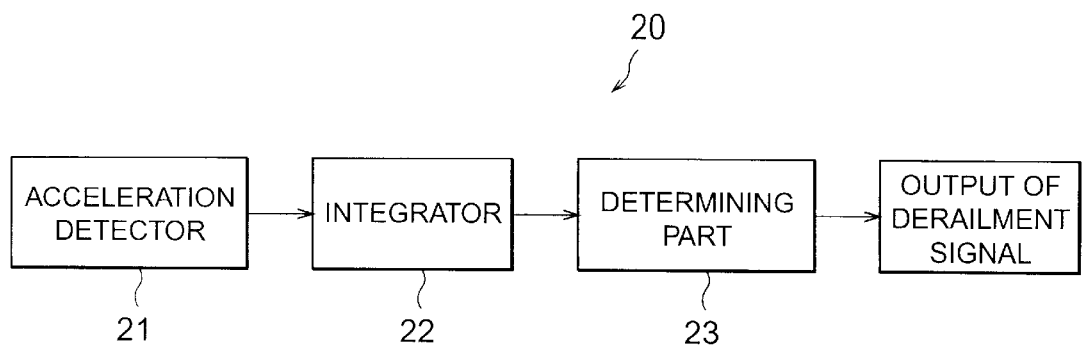
FIG. 5 is a control block diagram of the derailment detecting apparatus for rolling stock according to the second embodiment of the present invention.

FIG. 5 is a control block diagram of the derailment detecting apparatus according to the second embodiment of the present invention. The derailment detecting apparatus 20 shown in FIG. 5 is also provided two units per rolling stock 1, as in the case of the aforementioned derailment detecting apparatus 10. The derailment detecting apparatus 20 incorporates an acceleration detector 21 for detecting the vertical acceleration (a) at the carbody 2 above the spring rigging 6 of the truck 3 during traveling of the rolling stock 1. The acceleration detector 21 is attached to the carbody 2, which is the part above the spring rigging 6. The acceleration detector 21 is connected to an integrator 22 and the integrator 22 executes the double integral of output from the acceleration detector 21 to calculate a vertical displacement amount (d) at the mount position of the acceleration detector 21.

Figure 6:
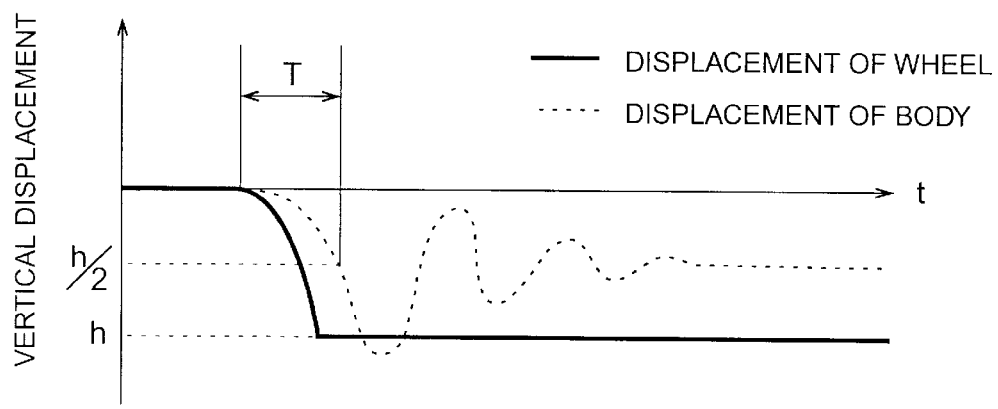
FIG. 6 is a graph for illustrating a setting procedure of evaluating time.

The integrator 22 executes the double integral of the vertical acceleration (a) every evaluating time (T) to obtain the vertical displacement amount (d). The evaluating time (T) (see FIG. 6) is defined as a time period from a start of descent of the carbody 2 to arrival at half the height of the rails 4, i.e., at h/2 (see FIG. 1) in a free fall of one axle of wheels 5 by a distance equal to the height h of the rails 4. This evaluating time (T) is preliminarily calculated as a value inherent to the rolling stock 1 equipped with the derailment detecting apparatus 20, by computer simulations or the like. The integrator 22 executes the double integral with the initial velocity of zero, for calculating the vertical displacement amount (d). That is, the double integral by the integrator 22 is carried out in a state in which all integration constants are zero. As a result, it is possible to cancel out the steady-state vertical displacement amounts of the carbody 2 etc. appearing while the rolling stock 1 is under normal traveling at high speed in the gradient territory, whereby the derailment can be detected accurately and surely.

The arithmetic result calculated by the integrator 22 is sent to the determining part 23. The determining part 23 determines that the rolling stock 1 is derailed, in the case that the calculated vertical displacement amount (d) is negative and an absolute value thereof is not less than a predetermined reference value (dc). The reference value (dc) is used as the comparison with the vertical displacement amount (d) obtained by the double integral of the vertical acceleration (a). In this case, the reference value (dc) is 40 mm for example. It is preferable here that the reference value (dc) is set to a value greater than a maximum change amount in the vertical direction of the spring rigging 6 during the normal traveling of the rolling stock 1. As a result, it is possible to surely discriminate the vertical displacement of the carbody 2 etc. in the event of derailment and the steady-state vertical displacement of the carbody 2 etc. during the normal traveling, both in the flat territory and in the gradient territory.

Figure 7:
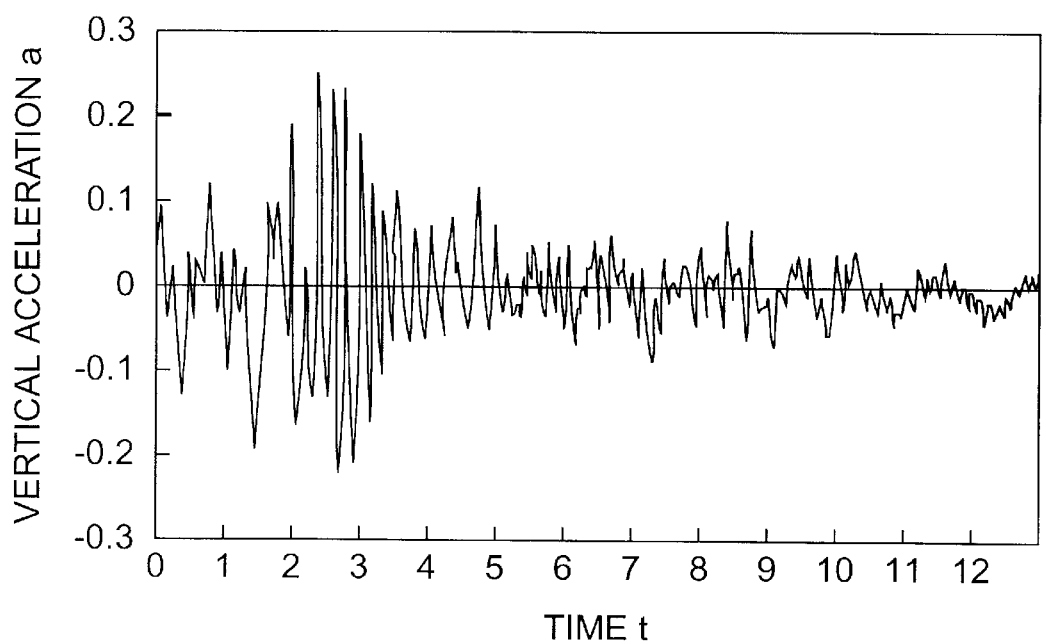
FIG. 7 is a graph to exemplify temporal change of vertical acceleration upon occurrence of derailment detected by the acceleration detector of FIG. 5.
Figure 8:
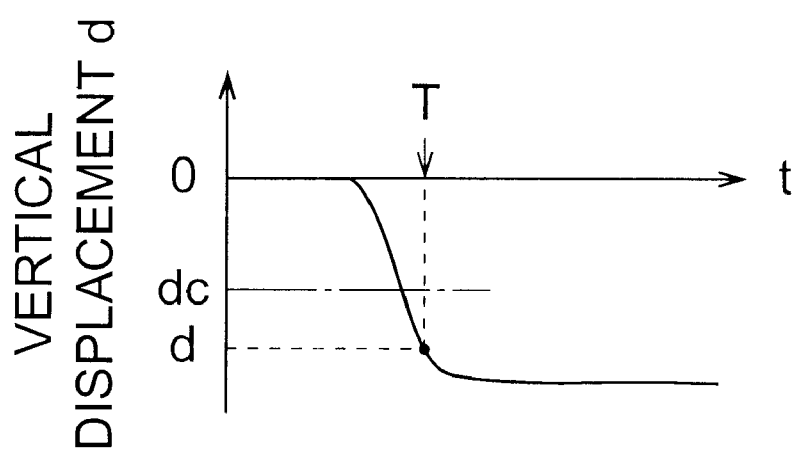
FIG. 8 is a graph showing temporal change of vertical displacement calculated by the integrator of FIG. 5 from the vertical acceleration in FIG. 7.

FIG. 7 is a graph to illustrate temporal change in the vertical acceleration (a) upon derailment, detected by the acceleration detector 21. FIG. 8 is a graph to show temporal change in the vertical displacement (d) calculated by the integrator 22 from the vertical acceleration (a) in FIG. 7. Since the wheels 5 of the rolling stock 1 drop from the rails 4 to the ground on the occasion of occurrence of derailment, the vertical displacement (d) increases largely within the evaluating time (T). On the other hand, during the normal traveling of the rolling stock 1, the carbody 2 vibrates in the vertical direction within the range of expansion and contraction in the vertical direction of the spring rigging 6 while the vertical vibration is relieved by the spring rigging 6. In general, the height of the rails 4 is greater than the maximum change amount of the spring rigging 6 in the vertical direction during the normal traveling. Therefore, once the rolling stock 1 is derailed, the carbody 2 etc. will descend by an amount exceeding the maximum change amount of the spring rigging 6 in the vertical direction during the normal traveling.

In general, the expansion and contraction amounts of the spring rigging 6 are, for example, ±30 mm and in that case, the maximum change amount of the spring rigging 6 is 60 mm. The evaluating time (T) is normally about 0.2 sec in the case of the ordinary rolling stock. Changing amount of the spring rigging 6 within the evaluating time (T) (about 0.2 sec) is not more than 20 mm. On the other hand, the height h of the rails 4 is normally 150 mm. In the case of the truck of two-axle structure, when one axle of wheels should be derailed, the vertical change (d) of the carbody would be about 75 mm at the center pivot of the truck 3. Therefore, the apparatus can be so structured that the reference value (dc)=−40 mm and that the determining part 23 determines whether the vertical displacement (d) calculated by the integrator 22 satisfies the condition of the vertical displacement (d)<−40 mm, as shown in FIG. 8. In this case, the determining part 23 outputs the derailment signal when the condition of the vertical displacement (d)<−40 mm is met.

In the derailment detecting method according to the second embodiment of the present invention, the vertical acceleration (a) appearing at the carbody 2 above the spring rigging 6 is detected by the acceleration detector 21 during the running of the rolling stock 1 on the rails 4. Then the vertical acceleration (a) detected is subjected to the double integral every evaluating time (T) by the integrator 22, thereby obtaining the vertically displacing amount per evaluating time (T) of the part above the spring rigging 6, i.e., the vertical displacement amount (d). Then the determining part 23 determines that the rolling stock 1 is derailed, in the case that the vertical displacement amount (d) is negative and the absolute value thereof is not less than the predetermined reference value (dc). The derailment can also be detected accurately and surely by the derailment detecting method according to the second embodiment of the present invention.

FIG. 9 is a control block diagram of the derailment detecting apparatus according to the third embodiment of the present invention. The derailment detecting apparatus 30 shown in FIG. 9 is equivalent to a combination of the derailment detecting apparatus 10 of the first embodiment with the derailment detecting apparatus 2 of the second embodiment, which were already described above. This derailment detecting apparatus 30 is also provided two units per rolling stock 1, as in the case of the aforementioned derailment detecting apparatus 10. In the derailment detection apparatus 30, the vertical acceleration (a) detected by the acceleration detector 31 is sent via the integrator 33 to a displacement determining part 34 and is also sent via the filter 35 to an acceleration determining part 36. When the displacement determining part 34 determines that the vertical displacement amount (d) is negative and that the absolute value thereof is not less than the predetermined reference value (dc), the displacement determining part 34 sends gate signal to a OR gate 38. When the acceleration determining part 36 determines that the absolute value of the vertical acceleration (a) in the predetermined frequency range is over the limit vertical acceleration (al) corresponding to the running velocity (v) detected by the car velocity detector 32, the acceleration determining part 36 sends gate signal to the OR gate 38. When the OR gate 38 receives gate signal from the displacement determining part 34 or the acceleration determining part 36, the derailment signal is outputted from the OR gate 38. The derailment can also be detected accurately and surely by use of the derailment detection apparatus 30 as described.

As described above, because the derailment of the rolling stock under traveling is detected automatically, the present invention is effectively applicable to the cases of preventing the derailed rolling stock from keeping running and stopping the rolling stock immediately upon occurrence of derailment. The present invention is also effectively applicable to both the rolling stock under manned operation and the rolling stock under unmanned operation.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A derailment detecting method for rolling stock, which is applied to rolling stock having a truck which comprises wheels rolling on rails, and spring rigging, and a carbody to which said truck is attached, said derailment detecting method for rolling stock comprising:

a step of making said rolling stock travel at varying running velocities on a predetermined route and measuring a maximum of vertical acceleration in a predetermined frequency range at said carbody above said spring rigging, at each of the varying running velocities;

a step of defining limit vertical acceleration from said maximum of vertical acceleration for each of said running velocities;

a step of detecting real running velocity of said rolling stock during traveling of said rolling stock on said route and detecting real vertical acceleration at said carbody above said spring rigging;

a step of extracting a component in said frequency range from said real vertical acceleration; and a step of determining that said rolling stock is derailed, in the case that an absolute value of the real vertical acceleration in said frequency range exceeds said limit vertical acceleration corresponding to said real running velocity.

2. The derailment detecting method for rolling stock according to claim 1, wherein said limit vertical acceleration is set to a value. greater than said maximum of vertical acceleration.

3. The derailment detecting method for rolling stock according to claim 1, wherein it is determined that said rolling stock is derailed, in the case that there occur a predetermined number of such events that the absolute value of said real vertical acceleration exceeds said limit vertical acceleration corresponding to said real running velocity within a predetermined time period.

4. The derailment detecting method for rolling stock according to claim 1, wherein said frequency range is a frequency range in which an absolute value of permissible vertical acceleration for assuring riding comfort is set at a minimum.

5. A derailment detecting method for rolling stock, which is applied to rolling stock having a truck which comprises wheels rolling on rails, and spring rigging, and a carbody to which said truck is attached, said derailment detecting method for rolling stock comprising:

a step of detecting vertical acceleration at said carbody above said spring rigging during running of said rolling stock on said rails;

a step of calculating a vertical displacement amount by double integral of said vertical acceleration every evaluating time, said evaluating time being defined as a time period from a start of descent of said carbody to arrival at half a height of said rails, in a free fall of one axle of said wheels by a distance equal to the height of said rails; and a step of determining that said rolling stock is derailed, in the case that said vertical displacement amount is negative and an absolute value thereof is not less than a predetermined reference value.

6. The derailment detecting method for rolling stock according to claim 5, wherein in calculating said vertical displacement amount, the double integral is carried out with initial velocity of zero.

7. The derailment detecting method for rolling stock according to claim 5, wherein said reference value is set to a value greater than a maximum change amount of said spring rigging in the vertical direction.

8. A derailment detecting apparatus for rolling stock, which is applied to rolling stock having a truck which comprises wheels rolling on rails, and spring rigging, and a carbody to which said truck is attached, said derailment detecting apparatus for rolling stock comprising:

a limit acceleration storage for storing limit vertical acceleration defined for each of varied running velocities from a maximum of vertical acceleration in a predetermined frequency range at said carbody above said spring rigging, said vertical acceleration being detected at each of said running velocities while said rolling stock is made to travel on a predetermined route, a car velocity detector for detecting real running velocity of said rolling stock traveling on said route;

an acceleration detector for detecting real vertical acceleration at said carbody above said spring rigging during traveling of said rolling stock on said route;

a filter for extracting a component in said frequency range from said real vertical acceleration; and a determining part for determining that said rolling stock is derailed, in the case that an absolute value of the real vertical acceleration in said frequency range exceeds said limit vertical acceleration corresponding to said real running velocity.

9. A derailment detecting apparatus for rolling stock, which is applied to rolling stock having a truck which comprises wheels rolling on rails, and spring rigging, and a carbody to which said truck is attached, said derailment detecting apparatus for rolling stock comprising:

an acceleration detector for detecting vertical acceleration at said carbody above said spring rigging during running of said rolling stock on said rails;

an integrator for executing double integral of said vertical acceleration every evaluating time to calculate a vertical displacement amount, said evaluating time being defined as a time period from a start of descent of said carbody to arrival at half a height of said rail, in a free fall of one axle of said wheels by a distance equal to the height of said rails; and a determining part for determining that said rolling stock is derailed, in the case that said vertical displacement amount is negative and an absolute value thereof is not less than a predetermined reference value.

* * * * *